3,732,326
SELECTIVE SORPTION OF LESS POLAR MOLE-
CULES WITH CRYSTALLINE ZEOLITES OF HIGH
SILICA/ALUMINA RATIO
Nai Yuen Chen, Titusville, N.J., assignor to
Mobil Oil Corporation
Filed May 19, 1970, Ser. No. 38,811
Int. Cl. C10g 25/04
U.S. Cl. 260—676 MS           10 Claims

ABSTRACT OF THE DISCLOSURE

A method of selectively sorbing a compound of low polarity in admixture with a compound of the same or greater polarity which comprises passing the mixture over a crystalline aluminosilicate having a silica/alumina mole ratio of at least 35.

BACKGROUND OF THE INVENTION

Field of the invention

Figure 1:
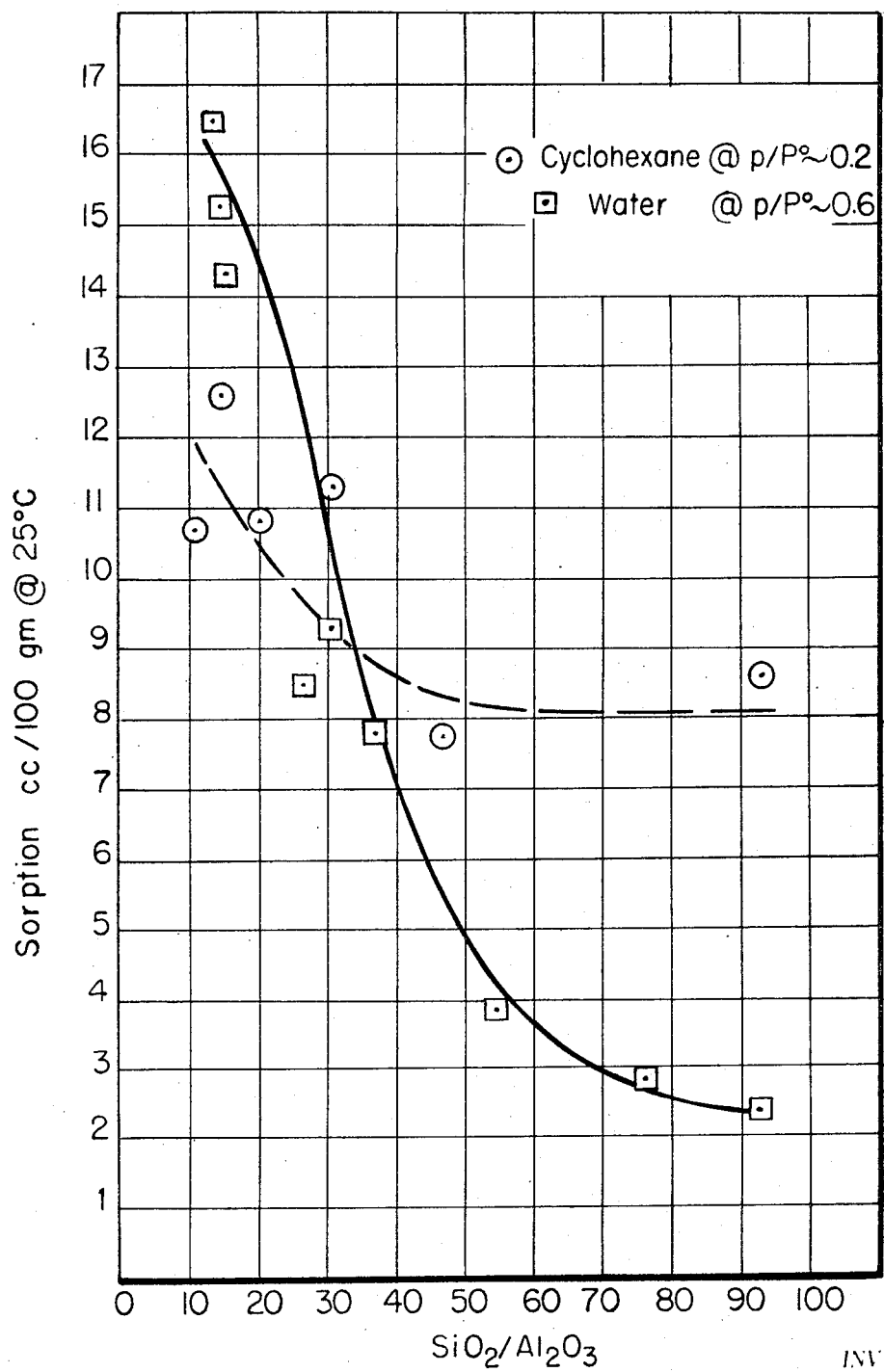

This invention relates to the use of crystalline aluminosilicates as adsorbents. More particularly, this invention relates to the use of crystalline aluminosilicates to selectively sorb compounds having low polarity which compounds are in admixture with compounds having a greater polarity.

Discussion of the prior art

The selective sorption properties of zeolites are generally known and have been described, for instance, in U.S. Pat. 2,850,549 to F. A. Ray, U.S. Pat. 2,866,835 to C. N. Kimberlin, Jr. et al., U.S. Pat. 3,037,338 to T. L. Thomas, and U.S. Pat. 3,218,367 to N. Y. Chen. The general sorption properties of zeolites have been disclosed in some of the earlier patents on the zeolites per se namely U.S. Pat. 2,882,243 and U.S. Pat. 2,882,244 to R. M. Milton and other patents. Additionally, there are numerous literature references especially those of Professor Barrer which deal extensively with the sorption properties of crystalline aluminosilicate zeolites. Generally speaking, crystalline aluminosilicates are shape selective in that they will admit compounds of designated geometry while excluding larger molecules. Thus, certain small pore zeolites will admit normal paraffins and exclude branch chain paraffins. Additionally, such crystalline aluminosilicates will exclude aromatics such as benzene while admitting normal hexane. It has been disclosed in British Pat. 600,453 of Apr. 9, 1948, to R. M. Barrer that zeolites can be employed as selective sorption agents and that such zeolites will sorb polar molecules in preference to less polar molecules. Thus, Barrer in British specification 600,453 discloses a process for complete or partial removal of polar and/or readily polarizable molecules from admixture with constituents of comparable or lesser polarity and of differing molecular dimensions by contacting the mixture with certain dehydrated crystalline zeolites, either natural or synthetics, the constituents being removed having a polarity comparable with or greater than the components remaining and molecular dimensions such that in the pure state they are occluded by the dehydrated crystals at rapid or finite rates. The constituents remaining in the mixture have a polarity comparable with or less than those removed and molecular dimensions such that in the pure state they either are not occluded by the crystals or are occluded considerably more slowly.

SUMMARY OF THE INVENTION

Broadly, this invention contemplates a method of selectively sorbing a compound of low polarity in admixture with a compound of the same or greater polarity which comprises passing the mixture over a crystalline aluminosilicate having a silica/alumina mole ratio of at least 35.

DESCRIPTION OF SPECIFIC EMBODIMENTS

It has now been discovered in accordance with the summary of the invention above set forth that crystalline aluminosilicates having a silica to alumina mole ratio of at least 35 have sorption properties such that they prefer molecules of lower polarity when such molecules are in admixture with compounds having higher polarity. Thus, the aluminosilicates at this silica/alumina ratio are considered to be hydrophobic in that they tend to reject water, a highly polar compound, in preference to hydrocarbons, generally non-polar. Thus, by the present invention, hydrocarbons can be sorbed into the porous structure of crystalline aluminosilicates when such hydrocarbons are in admixture with water or other more polar compounds. Thus, it has been discovered, surprisingly, that as zeolites have their silica to alumina mole ratio increased above 35, they become more hydrophobic and increasingly lose their affinity toward water. Competitive sorption studies reveal that the selective uptake of hydrocarbons with these high silica to alumina mole ratio zeolites in the presence of water vapor becomes a reality. The ratio of the sorption capacity for hydrocarbons to that for water indicates the unexpected increase in hydrophobicity. Thus, as this ratio exceeds 1 as the silica to alumina mole ratio goes beyond 35/1, the zeolite sorbs increasingly more hydrocarbon than water.

The hydrophobicity property of zeolites having a silica to alumina mole ratio in excess of 35 is not peculiar to specific zeolites, but is characteristic of the class of zeolites having silica to alumina mole ratios of at least 35. Generally speaking, zeolites must be treated to remove alumina from the framework so that the silica/alumina ratio can be adjusted so that it is at least 35. The silica/alumina ratio can be increased by any one of several techniques. One such technique involves the chelation of the zeolite, either natural or synthetic, with a suitable chelating agent. Suitable chelating agents include: ethylenediaminetetraacetic acid, sodium ethylenediaminetetraacetate and other such strongly acidic substances. In fact, it is possible to increase the silica/alumina ratio of zeolites by contacting a conventional zeolite such as mordenite with alternate treatment of steam and mineral acid in multiple alternate cycles of steaming and refluxing in acid. Such method is more fully disclosed in application Ser. No. 765,031 of Oct. 4, 1968, entitled Dealuminization of Mordenite, now U.S. Pat. 3,551,353. According to the method therein disclosed, a mineral acid such as HCl, $H_2SO_4$, $H_3PO_4$ and the like, preferably having a normality of at least between about 0.5 and 2 normal is contacted with the mordenite treated which is thereafter at a temperature between 600 and 1000° F. at one atmosphere $H_2O$ pressure. The amount of water present is not critical so long as there is some water present for hydrolysis to take place. The multiple cycles of steaming and acid refluxing have been found to markedly increase the silica to alumina ratio of the zeolite treated so that it is to between 35 and 100.

It should be mentioned that those zeolites which can be synthesized in a form wherein the silica to alumina mole ratio is at least 35 are especially suitable for the present invention and, since they have such a high silica content, can be used without any further treatment. One such zeolite is ZSM-5, the preparation of which is disclosed below. Particular suitable zeolites for use in the separation process of the present invention are mordenite, ZSM-5 and beta. Zeolite beta is disclosed in U.S. Pat. 3,308,069.

As indicated above, it has been found that these high silica/alumina zeolites can be utilized to selectively sorb less polar compounds from admixture with compounds having the same or greater polarity. Naturally, the molecule must have sufficient size to pass through the pores of the zeolite and to become occluded within the zeolite structure. However, it should be understood that the phenomenon is not based upon size selectively since it has been found that two molecules both of which have a size sufficient to enter the pores of the zeolite will be selectively sorbed depending upon their polarity. Thus, two molecules having identically the same size but differing polarity can be separated employing the zeolite separation technique of the present invention which will selectively sorb the less polar compound. For instance, hydrocarbons can be selectively sorbed from admixture of the same with water which is normally sorbed more readily into zeolites having silica to alumina mol ratios less than 35. The discovery which forms the basis of the present invention enables high silica zeolites to be used to separate one hydrocarbon from another and thus to assist in numerous commercial processes. Additionally, hydrocarbons can be separated from admixture in air or other gaseous stream. Thus, hydrocarbon emission from various chemical plants can be reduced employing zeolites which selectively sorb the hydrocarbons and reject the more polar constituents of the mixture being emitted. Additionally, hydrocarbons can be separated from admixture with more polar compounds such as alcohols, acids, aldehydes and highly substituted compounds containing halogens. Examples of other applications of the present invention include removal of trace paraffin impurities in aromatics production; the recovery of valuable chemicals such as paraxylene and the removal of acetic acid in the presence of water vapor from vapor exhausts in theraphthalic acid processes. Additionally, use of high silica/alumina zeolites as sorbents finds application in the recovery of hydrocarbon mists entrained in air from fermenters employed in the production of proteins from paraffinic hydrocarbons. It should be understood that the technique of the present invention has such wide application that it is impossible to specifically set forth herein all of the various processes in which molecules having low polarity are preferentially sorbed from admixture with molecules having greater polarity. The uses of the process of the present invention are virtually limitless.

In order to more fully illustrate the nature of the present invention and the manner of practicing the same, the following examples are presented. In the examples, the unexpected sorption properties of zeolites having a silica/alumina mole ratio in excess of 35 is demonstrated.

EXAMPLE 1

A commercially available source of mordenite known as Zeolon H obtained from Norton Company was found to have the following composition and properties:

| Composition: | Weight percent |
|---|---|
| Na | 0.30 |
| $SiO_2$ | 82.9 |
| $Al_2O_3$ | 12.8 |
| Fe | 0.06 |
| Ba | 0.06 |
| Ca | 0.10 |
| Mg | 0.002 |
| Ash | 84.3 |

Sorption properties:
| | |
|---|---|
| Cyclohexane | 7.8 |
| Normal hexane | 6.7 |
| $H_2O$ | 16.3 |

Surface area, m.$^2$/g., 408.

100 grams of Zeolon H were steamed at 1000° F. for 2 hours followed by refluxing in 2300 ml. of 2 N HCl for four hours. The product was filtered and washed with water until chloride free. One tenth of the product was retained and treatment was repeated on the remaining nine tenths. A total of ten steaming-acid leaching cycles was performed, the resultant dealuminized mordenite samples had $SiO_2/Al_2O_3$ ratios ranging from 14 to 105.

Their sorption capacity for water and cyclohexane was measured at $p/p°$ (relative pressure wherein $p$ is the sorption system equilibrium pressure and $p°$ is the saturation vapor pressure of the adsorbate) of 0.6 and 0.2 respectively. The results are shown in FIG. 1. It can be seen from FIG. 1 that when the silica to alumina ratio of the zeolite was increased to about 35 and above, the zeolite changed from being a hydrophilic sorbent to being a hydrophobic one, i.e., the zeolite prefers water over hydrocarbon when being hydrophilic, and prefers hydrocarbon over water when being hydrophobic.

EXAMPLE 2

475 grams of H-Zeolon were pelleted and steamed at 1000° F. for 2 hours. The steamed product was placed in a continuous flow ion exchanger and exchanged with 20 liters of 1 N HCl at 180° F. at a flow rate of about 1 l./hr. and then washed with $H_2O$ until chloride free. The steaming acid exchange, water-washing cycle was repeated 12 times. The resultant dealuminized mordenite had a silica to alumina mole ratio of 39. The so dealuminized mordenite was used in various sorption tests to determine the amount of water and n-hexane sorbed at various relative pressures. Isotherms resulting from these sorption experiments are found in FIG. 2. It can be seen from FIG. 2 that the zeolite which has a silica to alumina mole ratio in excess of 35 preferentially sorbs normal hexane, the less polar of the two compounds. It should be noted that while dealuminized mordenite, generally speaking, preferentially sorbs compounds having low polarity over compounds having a higher polarity that there are some exceptions to this general rule. For instance, it has been found that acetic acid is unexpectedly sorbed with even greater preference than normal hexane although acetic acid is more polar than normal hexane. The dealuminized mordenite is, therefore, especially useful in recovering paraffins such as normal hexane and other normal paraffins from admixture with water.

EXAMPLE 3

Figure 3:
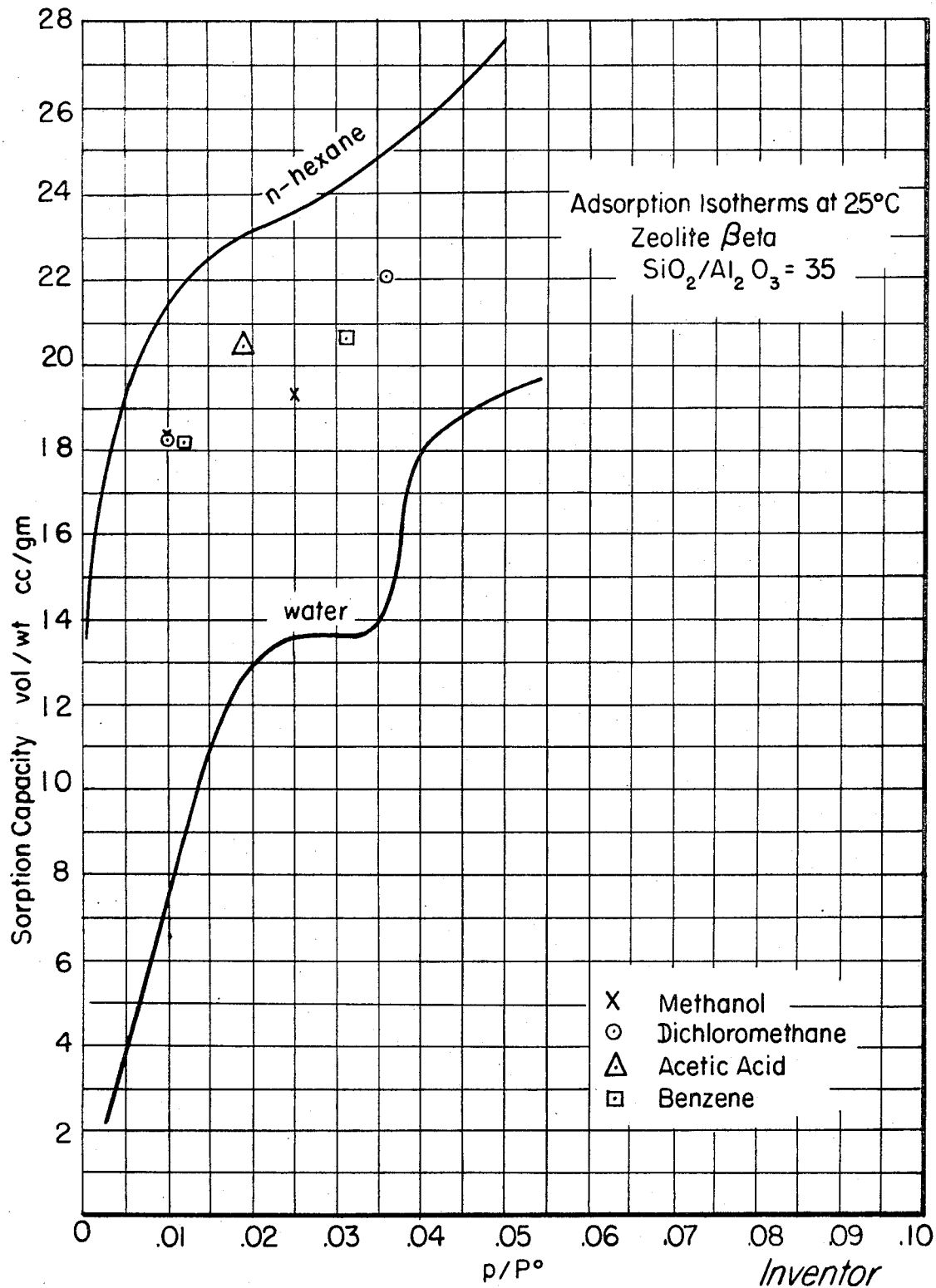

A crystalline aluminosilicate known as zeolite beta and having a silica to alumina ratio of 35 was prepared and tested to determine the isotherms for normal hexane and water. These isotherms are set forth in FIG. 3.

The starting beta crystalline aluminosilicate was prepared by reaction: 4.35 grams $NaAlO_2$ (41.8 weight percent $Al_2O_3$, 33.5 weight percent $Na_2O$), 41.6 grams 40 weight percent TEAOH (tetraethylammonium hydroxide) and 109 grams Ludox (30 weight percent silica). These components were mixed together adding the $NaAlO_2$ to the TEAOH solution. This was heated to effect complete solution of $NaAlO_2$ and then followed by addition of the Ludox (30 percent $SiO_2$) with an additional mixing for 10 minutes. The mixture was changed to a glass container in the autoclave, heated to about 300° F. and then held for 7 days under an autogenous pressure of 160–260 p.s.i.g.

The resulting product was filtered, washed with one liter $H_2O$ and then dried at 230° F. (48.5 grams product was obtained). The dried product was reported to be beta zeolite by X-ray analysis.

The above beta zeolite was exchanged with 160 grams of 25 weight percent $NH_4Cl$ per contact, 40 gram sample was contacted 6-one hour contacts at 180–195° F. with the $NH_4Cl$ solution. Following the $NH_4Cl$ exchange the product was washed free of chloride ion, air dried at 230° F., pelleted and sized to 14–25 mesh, and then calcined for 10 hours at 1000° F. The final catalyst was found to be 95 percent crystalline beta zeolite and had a surface area of 556 m.$^2$/g.

Figure 2:
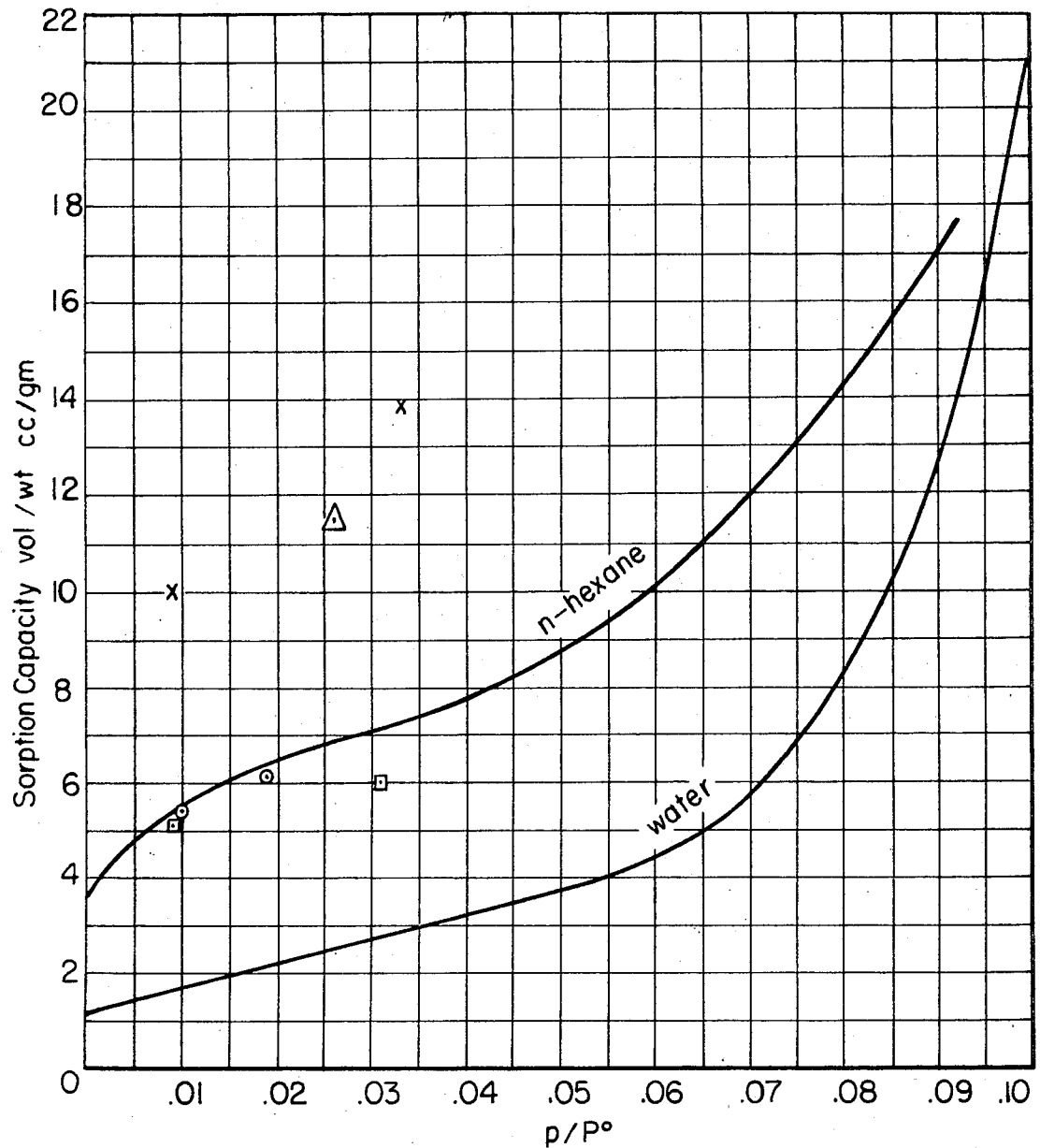

From the isotherm in FIG. 2, it is seen that zeolite beta having a silica to alumina ratio of 35 consistently prefers normal hexane to other hydrocarbons which have a greater polarity, notably methanol, dichloromethane, acetic acid and benzene. Thus, this zeolite having a silica to alumina mole ratio of 35 is suitable as a selective sorbing agent to remove compounds having low polarity from admixture with compounds having greater polarity. This is so notwithstanding the fact that the compounds having a greater polarity are also organic compounds. This finding is of commercial significance as outlined above in that it allows recovery of products based upon polarity independent of molecular size, solubility and other factors.

EXAMPLE 4

A crystalline aluminosilicate known as ZSM-5 and prepared in accordance with Belgian Patent 713,576 was prepared by interacting the following solutions:

(A) TPABr (tetrapropylammonium bromide) solution

| | | |
|---|---|---|
| TPABr (RSA) | g | 20 |
| $H_2O$ | ml | 200 |

(B) Silicate solution

| | | |
|---|---|---|
| Q-Brand (28.9 wt. percent $SiO_2$) (8.9 wt. percent $Na_2O$) | g | 160 |
| $H_2O$ | ml | 400 |

(C) $NaAlO_2$ solution

| | | |
|---|---|---|
| $NaAlO_2$ (44.7% $Al_2O_3$) (33.5% $Na_2O$) | g | 2 |
| $H_2O$ | ml | 100 |

(D) Sulfuric acid solution

| | | |
|---|---|---|
| $H_2SO_4$ (97%) | g | 16 |
| $H_2O$ | ml | 100 |

These solutions were mixed together adding Solution (A) to Solution (B) then adding (C) while being stirred vigorously finally adding (D) with continued stirring for an additional 10 minutes. The resulting mixture was charged to a polypropylene container and placed in a hot water bath at 212° F., held there for 6 days during which time the product crystallized. The product was separated from the liquor by filtration and water washing followed by drying at 230° F. Product yield in this preparation was 36.3 grams on dry basis.

In preparing the final product, 16.7 grams of the above, dried product, ZSM-5, was first calcined for 10 hours at 900° F. and then ion exchanged 4-one hour contacts at room temperature with 167 cc. of 0.5 N $NH_4Cl$ solution per contact. Following the $NH_4Cl$ exchange the $NH_4$ ZSM-5 was filtered and washed with one liter of water. The resulting $NH_4$ ZSM-5 crystalline aluminosilicate was further contacted for one hour at 190° F. with a solution, 0.5 N $ZnCl_2$+0.5 N $NH_4Cl$, and then water washed free of chloride ion, dried at 230° F., pelleted and size 14–25 mesh, and finally calcined for 10 hours at 1000° F.

The final product had an $Al_2O_3$ content of 3.01 weight percent and Zn content of 1.02 weight percent. The resultant material had a silica to alumina mole ratio of greater than 50.

Figure 4:
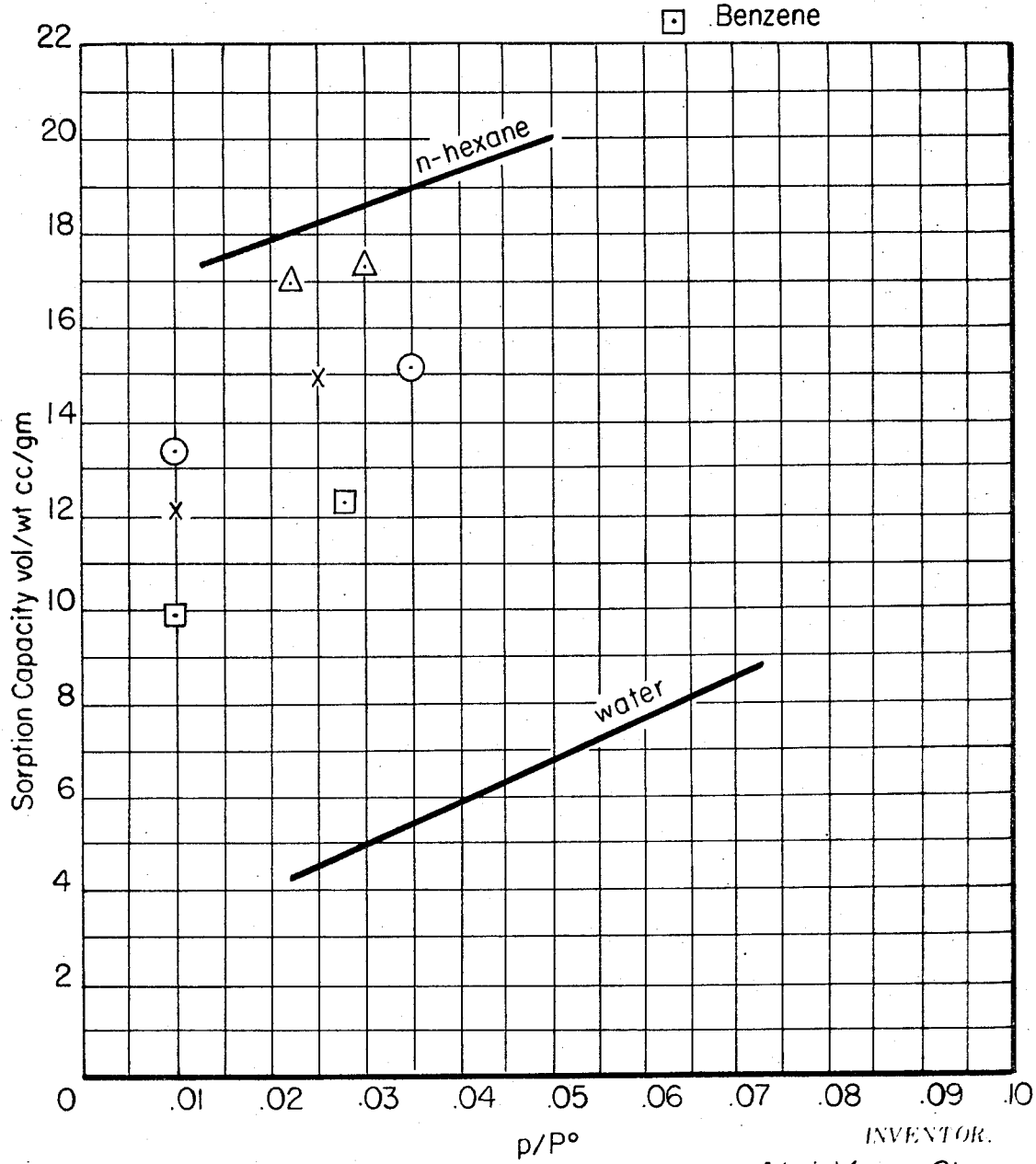

The sorption properties of the ZSM-5 zeolite were determined and sorption isotherms for n-hexane and water are set forth in FIG. 4. Similarly, it is observed that this high silica/alumina zeolite preferentially sorbs normal hexane. Generally speaking, this zeolite preferentially sorbs the compound in a mixture which has the lower polarity. Thus, from FIG. 4, it is seen that the zeolite sorbs substantially more normal hexane than water and, in fact, sorbs substantially more of compounds such as acetic acid, benzene, dichloromethane and methanol than water. These later four organic compounds are more polar than normal hexane and less polar than water. Consequently, they are sorbed in amounts less than normal hexane is sorbed, but in amounts substantially more than the volume percent water sorbed at the same relative pressure.

Thus, by using zeolites such as ZSM-5 characterized by a silica to alumina ratio in excess of 35, it has been found that polar liquids such as water, methanol and tert-butanol are very weakly sorbed and are readily separated from admixture with hydrocarbons such as benzene, hexane and cyclohexane. One such methanol comprises passing the mixture over a steamed sample of HZSM-5 or other zeolite having a silica/alumina ratio in excess of 35. The least sorbed material elutes from the sample first.

EXAMPLE 5

In order to test the competitive selective sorption properties of zeolites having a silica to alumina mole ratio in excess of 35, several competitive sorption tests were performed. The results of these competitive sorption tests are set forth in Table 1 below. Briefly, the tests set forth below were conducted by obtaining a six-inch column of HZSM-5 zeolite having a silica to alumina mole ratio of about 35. The six-inch column was installed in a standard gas chromatograph F and M 5750 which chromotograph contained a blank column for a reference. Each column contained between 3.5 and 4 grams of the HZSM-5 zeolite employed. The mixtures designated below were injected into the column in the size sample indicated in the table below. The retention times and peak maxima in terms of seconds were determined. The peak maxima is the time in seconds at which the greatest amount of eluting solvent is collected. The first component of the mixture is collected and analyzed. In the case of the benzene:water mixture, the water eluted between the beginning up to 90 seconds after the experiment had begun. The sample was colleced and analyzed and found to be greater than 99 percent by weight pure water. The benzene was collected beginning with 100 seconds into the experiment up to 360 seconds. The greatest amount of benzene eluted from the column after 169 seconds had elapsed. The sample of benzene collected between the 100 second mark and the 360 second mark was analyzed and found to be greater than 99 percent by weight pure benzene. The other mixtures were tested to determine which component would be selectively sorbed. All of the other tests were conducted in the same way as the benzene:water mixture and the recovered components were analyzed by gas chromatography. In all instances, the component having the greater polarity eluted first followed by fthe less polar substance. This indicates that an HZSM-5 zeolite having a silica to alumina ratio of at least 35 selectively and preferentially sorbs the component of lesser polarity when the same is in admixture with a substance characterized by a higher dielectric constant.

TABLE 1.—SELECTIVE SEPARATION OF HYDROPHOBIC AND HYDROPHILIC FLUIDS OVER STEAMED HZSM-5 USING CHROMOTOGRAPHIC TECHNIQUES

| Components in mixture (50/50) | Column temperature (° C.) | Sample size (μl) | Retention times of peak maxima (seconds) 1 | 2 | Fraction isolated between elution times of— | Component | Purity (percent) |
|---|---|---|---|---|---|---|---|
| Benzene:water | 175 | 50 | 23 | 169 | 0 to 90 seconds / 100 to 360 seconds | Water / Benzene | +99 / +99 |
| n-Hexane:water | 225 | 50 | 14 | 202 | 0 to 90 seconds / 150 to 360 seconds | Water / Hexane | +99 / +99 |
| Cyclohexane:methanol | 200 | 50 | 13 | 341 | 0 to 110 seconds / 180 to 600 seconds | Methanol / Cyclohexane | +99 / +99 |
| Benzene:t-BuOH | 175 | 50 | 15 | 189 | 0 to 80 seconds / 100 to 400 seconds | t-BuOH / Benzene | +99 / +99 |

ZSM-5 compositions can also be identified, in terms of mole ratios of oxides, as follows:

$$0.9\pm0.2\ M_{2/n}O:W_2O_3:6\text{--}100YO_2:zH_2O$$

wherein M is a cation, $n$ is the valence of said cation, W is selected from the group consisting of aluminum and gallium, Y is selected from the group consisting of silicon and germanium and z is from 0 to 40. In a prefered synthesized form, the zeolite has a formula, in terms of mole ratios of oxides, as follows:

$$0.9\pm0.2M_{2/n}O:Al_2O_3:6100SiO_2:zH_2O$$

and M is selected from the group consisting of a mixture of alkali metal cations, especially sodium, and tetraalkylammonium cations, the alkyl groups of which preferably contain 2–5 carbon atoms.

Members of the family of ZSM-5 zeolites possess a definite distinguishing crystalline structure whose X-ray diffraction pattern shows the following significant lines:

TABLE 2

| Interplanar spacing $d(A)$: | Relative intensity |
|---|---|
| 11.1±0.3 | s. |
| 10.0±0.3 | s. |
| 7.4±0.2 | w. |
| 7.1±0.2 | w. |
| 6.3±0.2 | w. |
| 6.04±0.2 | w. |
| 5.97±0.2 | w. |
| 5.69±0.1 | w. |
| 5.56±0.1 | w. |
| 5.01±0.1 | w. |
| 4.60±0.1 | w. |
| 4.35±0.1 | w. |
| 4.25±0.1 | w. |
| 3.85±0.1 | vs. |
| 3.75±0.05 | s. |
| 3.71±0.05 | s. |
| 3.64±0.05 | m. |
| 3.04±0.05 | w. |
| 2.99±0.05 | w. |
| 2.94±0.05 | w. |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak and $d$(obs.) the interplanar spacing in A, corresponding to the recorded lines, were calculated. In Table 1, the relative intensities are given in terms of the symbols s.=strong, m.=medium, ms.=medium strong, mw.=medium weak and vs.=very strong.

Zeolite ZSM-5 can be suitably prepared by preparing a solution containing tetrapropyl ammonium hydroxide, sodium oxide, an oxide of aluminum or gallium, an oxide of silica or germanium and water and having a composition falling within the following ranges:

TABLE 3

| | Broad | Preferred | Particularly preferred |
|---|---|---|---|
| OH⁻/YO₂ | 0.07–10.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum or gallium and Y is silicon or germanium maintaining the mixture until crystals of the zeolite are formed. It is noted that an excess of tetrapropylammonium hydroxide can be used which would raise the value of OH⁻/YO₂ above the ranges set forth supra. The excess hydroxide, of course, does not participate in the reaction. Thereafter, the crystals are separated from the liquid and recovered. Typical reaction conditions consists of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

I claim:

1. A method of selectively sorbing a hydrocarbon of low polarity in admixture with a compound of greater polarity than said low polarity hydrocarbon which comprises passing the mixture over a crystalline aluminosilicate having a silica/alumina mole ratio of at least 35 and pores of sufficient size to afford entry of said hydrocarbon of low polarity and said compound of greater polarity, the latter being selected from the group consisting of water, alcohols, acids, aldehydes and halogen-substituted compounds.

2. A method according to claim 1 wherein said compound of greater polarity is water.

3. A method according to claim 1 wherein said compound of greater polarity is an alcohol.

4. A method according to claim 3 wherein said alcohol is methanol.

5. A method according to claim 3 wherein said alcohol is tert-butanol.

6. A method according to claim 1 wherein said hydrocarbon of low polarity is an alkane.

7. A method according to claim 6 wherein said alkane is hexane.

8. A method according to claim 1 wherein said crystalline aluminosilicate is a dealuminized mordenite having a silica/alumina mole ratio of at least 35.

9. A method according to claim 1 wherein said zeolite is a form of crystalline aluminosilicate beta having a silica to alumina mole ratio of at least 35.

10. A method according to claim 1 wherein said crystalline aluminosilicate has a formula, expressed in terms of mole ratios of oxides, as follows:

$$0.9\pm0.2\ M_{2/n}O:W_2O_3:35\text{--}100\ YO_2:zH_2O$$

wherein M is a cation, $n$ is the valence of said cation, W is selected from the group consisting of aluminum and gallium, Y is selected from the group consisting of silicon and germanium and z is from 0 to 40, said zeolite having the X-ray diffraction pattern of Table 2 of the specification.

References Cited
UNITED STATES PATENTS 2,988,503   6/1961   Milton et al. _____ 260—676 MS
3,485,748   12/1969   Eberly et al. _____ 260—676 MS HERBERT LEVINE, Primary Examiner U.S. Cl. X.R.

208—307, 310; 55—75; 210—41; 260—666 SA, 674 SA